United States Patent
Meier

(10) Patent No.: US 9,725,025 B2
(45) Date of Patent: Aug. 8, 2017

(54) UNLOADING APPARATUS FOR DRY BULK MATERIAL

(71) Applicant: Vincent R. Meier, Topeka, KS (US)

(72) Inventor: Vincent R. Meier, Topeka, KS (US)

( * ) Notice: Subject to any disclaimer, the term of this patent is extended or adjusted under 35 U.S.C. 154(b) by 121 days.

(21) Appl. No.: 14/634,213

(22) Filed: Feb. 27, 2015

(65) Prior Publication Data
US 2015/0239384 A1 Aug. 27, 2015

Related U.S. Application Data

(60) Provisional application No. 61/945,467, filed on Feb. 27, 2014.

(51) Int. Cl.
*B60P 1/60* (2006.01)
*B60P 1/42* (2006.01)

(52) U.S. Cl.
CPC .. *B60P 1/60* (2013.01); *B60P 1/42* (2013.01)

(58) Field of Classification Search
CPC ...... B60P 1/32; B60P 1/40; B60P 1/58; B60P 1/60
USPC .... 406/39, 40; 414/381, 395, 488, 489, 526; 222/166; 298/1 V
See application file for complete search history.

(56) References Cited

U.S. PATENT DOCUMENTS

| | | | |
|---|---|---|---|
| 2,269,561 A | 1/1942 | Strayer | |
| 2,756,881 A | 7/1956 | Sims | |
| 3,154,202 A | 10/1964 | Heltzel | |
| 3,260,414 A | 7/1966 | Mora | |
| 4,157,150 A * | 6/1979 | Hetrick | E01C 19/2005 198/670 |
| 4,187,047 A | 2/1980 | Squifflet, Sr. | |
| 4,242,223 A | 12/1980 | Christner et al. | |
| 4,247,228 A | 1/1981 | Gray et al. | |
| 4,289,428 A * | 9/1981 | Hiorns | B60P 1/62 222/195 |
| 4,479,362 A | 10/1984 | McWhorter et al. | |
| 4,540,327 A * | 9/1985 | Happel | B60P 1/42 198/317 |
| 4,568,239 A | 2/1986 | Sims | |
| 4,775,275 A | 10/1988 | Perry | |
| 5,096,336 A | 3/1992 | Merrett et al. | |
| 5,199,826 A * | 4/1993 | Lawrence | B60P 1/60 406/137 |
| 5,378,047 A * | 1/1995 | Merrett | B60P 1/60 298/17 R |
| 5,533,829 A * | 7/1996 | Campbell | E01C 19/174 404/108 |
| 5,669,531 A * | 9/1997 | Hagemeyer | B60P 1/40 198/671 |

(Continued)

FOREIGN PATENT DOCUMENTS

JP 58152719 10/1983

*Primary Examiner* — Joseph Dillon, Jr.
(74) *Attorney, Agent, or Firm* — Erickson Kernell IP, LLC

(57) ABSTRACT

An unloading apparatus is coupled to a dump truck loaded with dry bulk material to quickly unload the truck for return to service. The unloading apparatus is coupled to the outlet of the truck carrying its dry material load, and coupled to a receiver which receives the dry material discharged from the auger as the truck load bed is raised. Compressed air is delivered to the load bed along the sides and outlet to force the dry material dust to the outlet and out of the truck. A vibrator is coupled to the bed of the truck to aid in the discharge of the dry material load.

16 Claims, 4 Drawing Sheets

(56) References Cited

U.S. PATENT DOCUMENTS

| | | | | |
|---|---|---|---|---|
| 5,947,347 A * | 9/1999 | Cline, Sr. | ............... | B60P 1/42 |
| | | | | 141/313 |
| 6,398,137 B1 * | 6/2002 | Manon | ............... | A01C 15/18 |
| | | | | 239/672 |
| 6,409,274 B1 | 6/2002 | Merrett | | |
| 6,527,428 B2 | 3/2003 | Guntert, Jr. et al. | | |
| 6,623,233 B2 * | 9/2003 | Peveling | ............... | B65D 88/72 |
| | | | | 406/138 |
| 6,698,993 B2 | 3/2004 | Stephens | | |
| 7,063,497 B2 | 6/2006 | Mast et al. | | |
| 9,428,330 B2 * | 8/2016 | Lopez | ............... | B65D 88/027 |
| 2002/0181319 A1 | 12/2002 | Dahlinger et al. | | |
| 2003/0142579 A1 * | 7/2003 | Throop | ............... | B28C 7/06 |
| | | | | 366/3 |
| 2004/0184889 A1 * | 9/2004 | Rexius | ............... | B60P 1/60 |
| | | | | 406/42 |
| 2006/0123745 A1 * | 6/2006 | Pobihushchy | ............... | E02F 3/8816 |
| | | | | 55/354 |
| 2008/0038070 A1 * | 2/2008 | Dunlop | ............... | B60P 1/00 |
| | | | | 406/42 |
| 2009/0135665 A1 | 5/2009 | Contamin et al. | | |
| 2009/0285643 A1 * | 11/2009 | Brown | ............... | B60P 1/60 |
| | | | | 406/41 |
| 2011/0180637 A1 * | 7/2011 | Kline | ............... | B01F 3/1221 |
| | | | | 239/670 |
| 2014/0037407 A1 * | 2/2014 | Andersson | ............... | B60P 1/38 |
| | | | | 414/326 |
| 2015/0078878 A1 * | 3/2015 | Wilcox | ............... | B65G 41/002 |
| | | | | 414/809 |

\* cited by examiner

UNLOADING APPARATUS FOR DRY BULK MATERIAL

CROSS-REFERENCE TO RELATED APPLICATION

This application claims the benefit of co-pending application Ser. No. 61/945,467, filed on Feb. 27, 2014, entitled UNLOADING APPARATUS FOR DRY BULK MATERIAL.

FIELD

The present invention relates to improvements in the unloading of dry bulk materials from dump trucks and, more particularly, to an unloading apparatus for rapidly and completely unloading the dry bulk material from a truck so that the truck may quickly return to service and pick up another load of the same or different dry bulk material.

BACKGROUND

Shipments of cement in powder form are typically transported in water-tight hopper style trucks that are unloaded at a receiving cement silo with the aid of conventional truck feeders and air supply systems. The unloading process takes about forty-five minutes to an hour for each truck. During this lengthy unloading process, the truck engine is running at a high rpm to maintain a constant flow of cement from the truck to the silo. Workers at the site are thus subjected to continuous, detrimentally high noise levels, particularly when a number of trucks are unloading simultaneously. Additionally, a large amount of airborne cement dust is created.

This lengthy unloading process is inefficient, and increases fuel consumption and capital equipment, maintenance and labor costs. The truck driver is idle and may do nothing but wait during the unloading process. Because the transportation and delivery equipment is specialized, it may limit the opportunity for back hauls. For example, a cement truck hauling dry powder cement can only haul cement, which means that the truck is empty after it has delivered its load and is returning to pick up another load. Additionally, hopper style trailers are more expensive than conventional dump trailers, and have high capacity feeder and air systems on board which must be maintained to accommodate the transfer of the load from the truck to the receiving silo.

SUMMARY

The unloading apparatus of the present invention is coupled to a dump truck loaded with dry bulk material to fully unload the truck in approximately eight to ten minutes (depending upon the size of the load) for immediate return to service. The unloading apparatus is coupled to the outlet of the truck carrying its dry material load, and coupled to a receiver by a flexible interfacing pipe which receives the dry material discharged from the auger as the truck load bed is raised by hydraulic cylinders to an angle sufficient to sustain constant flow through the outlet to the auger. Compressed air is delivered to the load bed along the sides and outlet to force the dry material dust to the outlet and out of the truck. Additionally, a vibrator is coupled to the bed of the truck to aid in the discharge of the dry material load. With the truck bed cleaned out, the truck may be loaded with another dry bulk material for the back haul. In this way, the truck is not returning empty, which wastes time and fuel.

Other advantages of this invention will become apparent from the following description taken in connection with the accompanying drawings, wherein is set forth by way of illustration and example, an embodiment of the present invention.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials as suitable or preferred for a given purpose in connection with the invention implies that mixtures or combinations of any two or more members of the group or class may be equally suitable or preferred.

Figure 1:
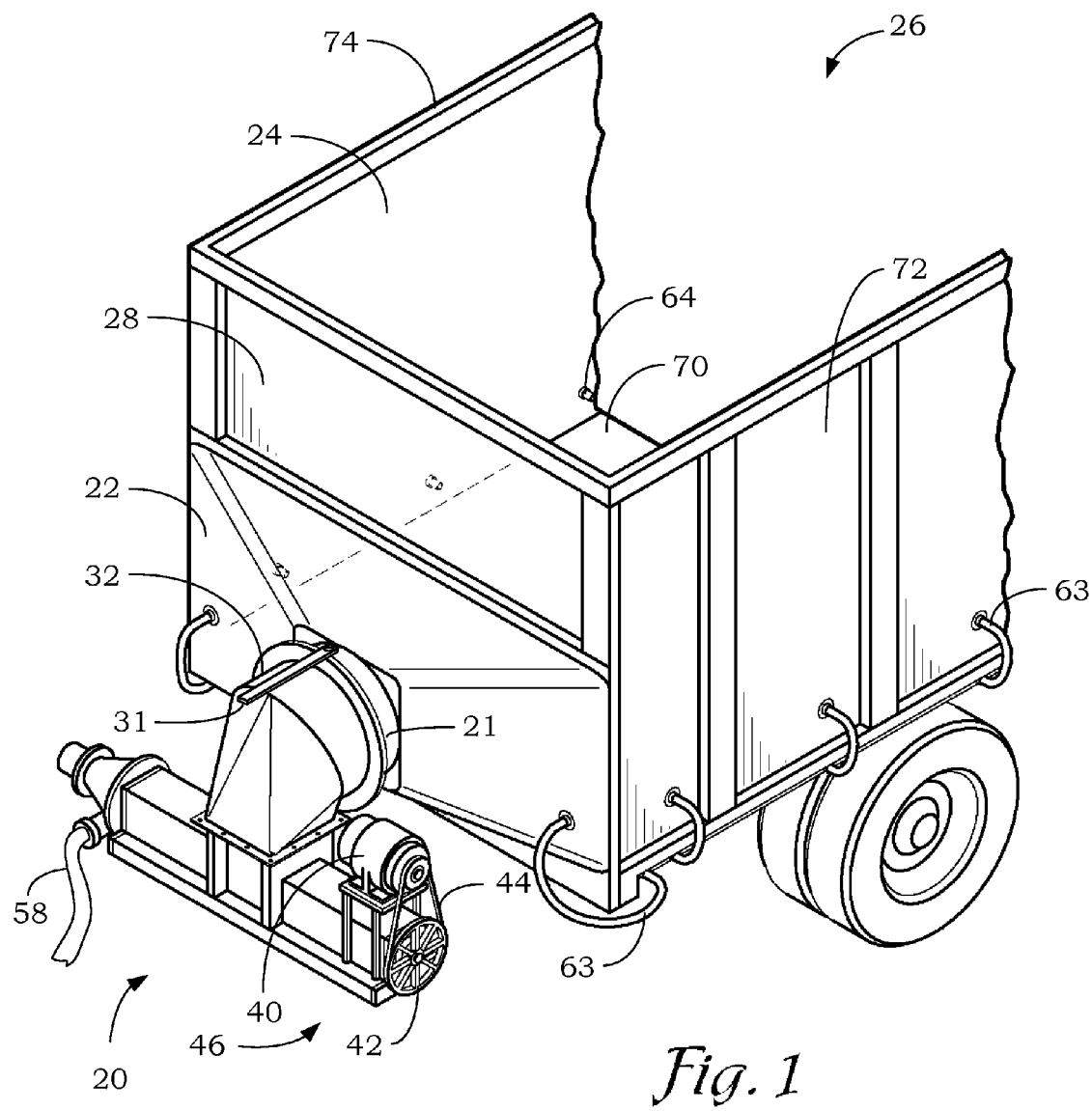
FIG. 1 is a partial perspective view of unloading apparatus coupled to the outlet of a dump truck load bed.
Figure 2:
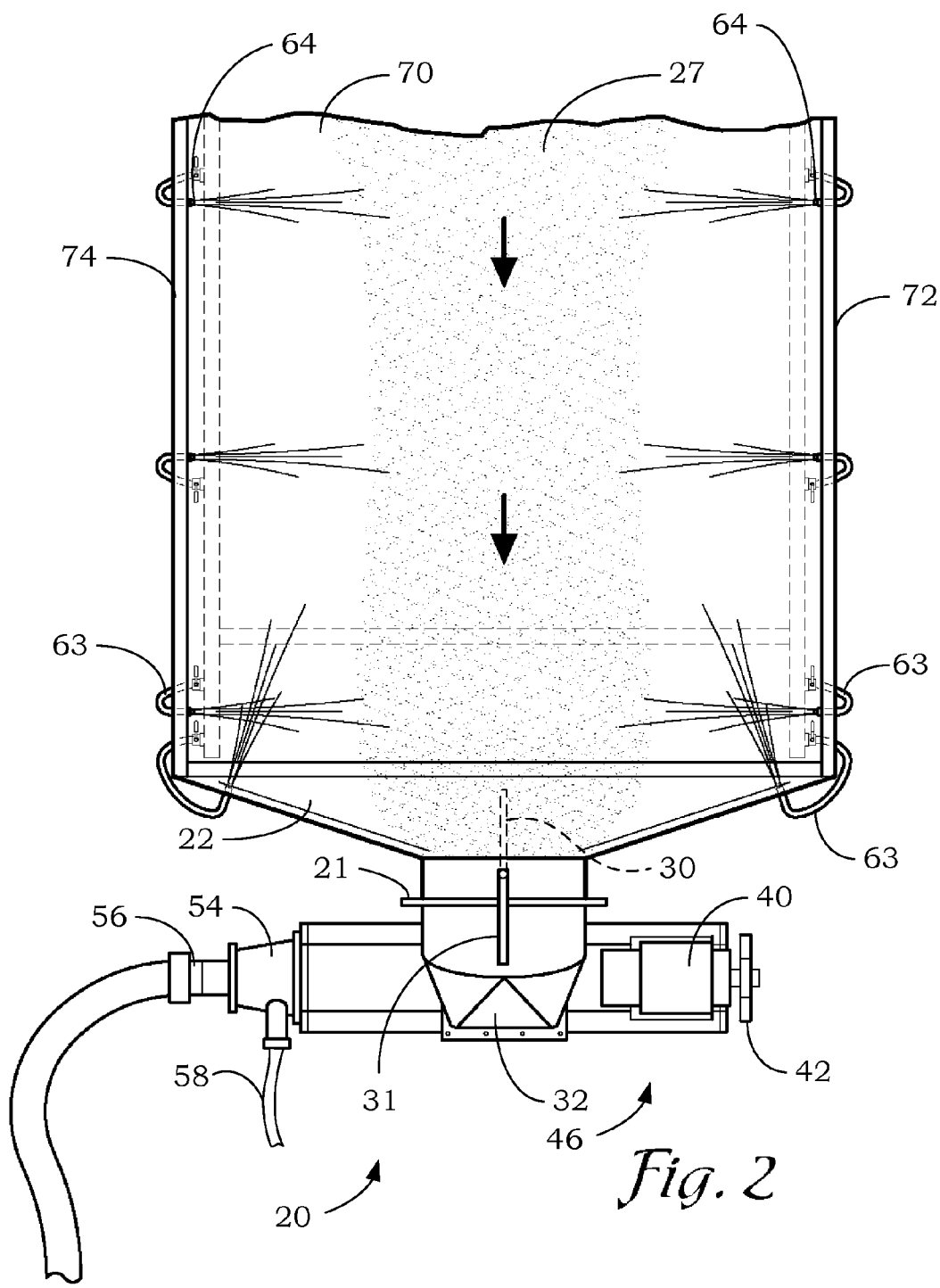
FIG. 2 is a partial plan view of the interior of the dump truck load bed shown in FIG. 1 during unloading.
Figure 3:
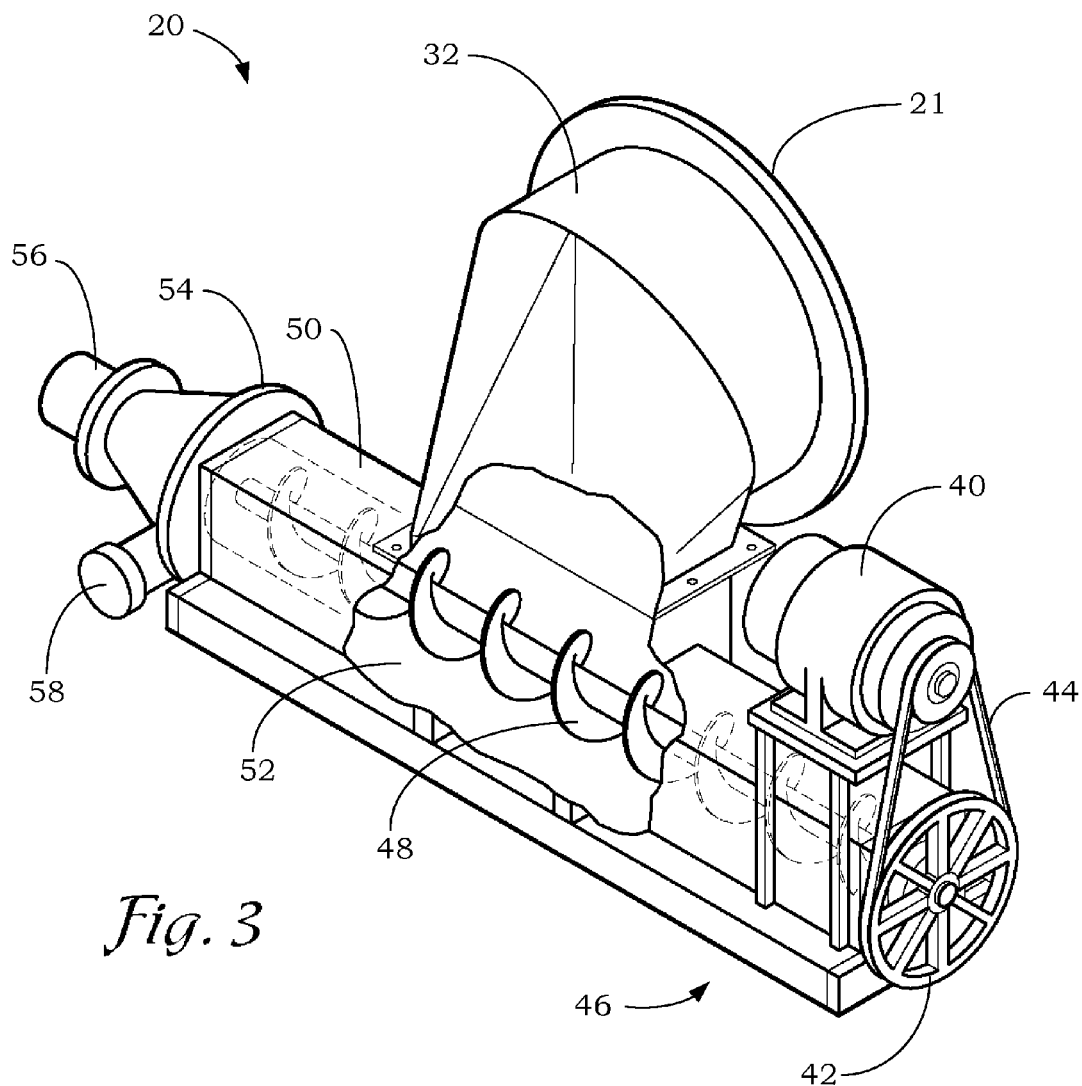
FIG. 3 is a partial cut away perspective view of the unloading apparatus shown in FIG. 1.
Figure 4:
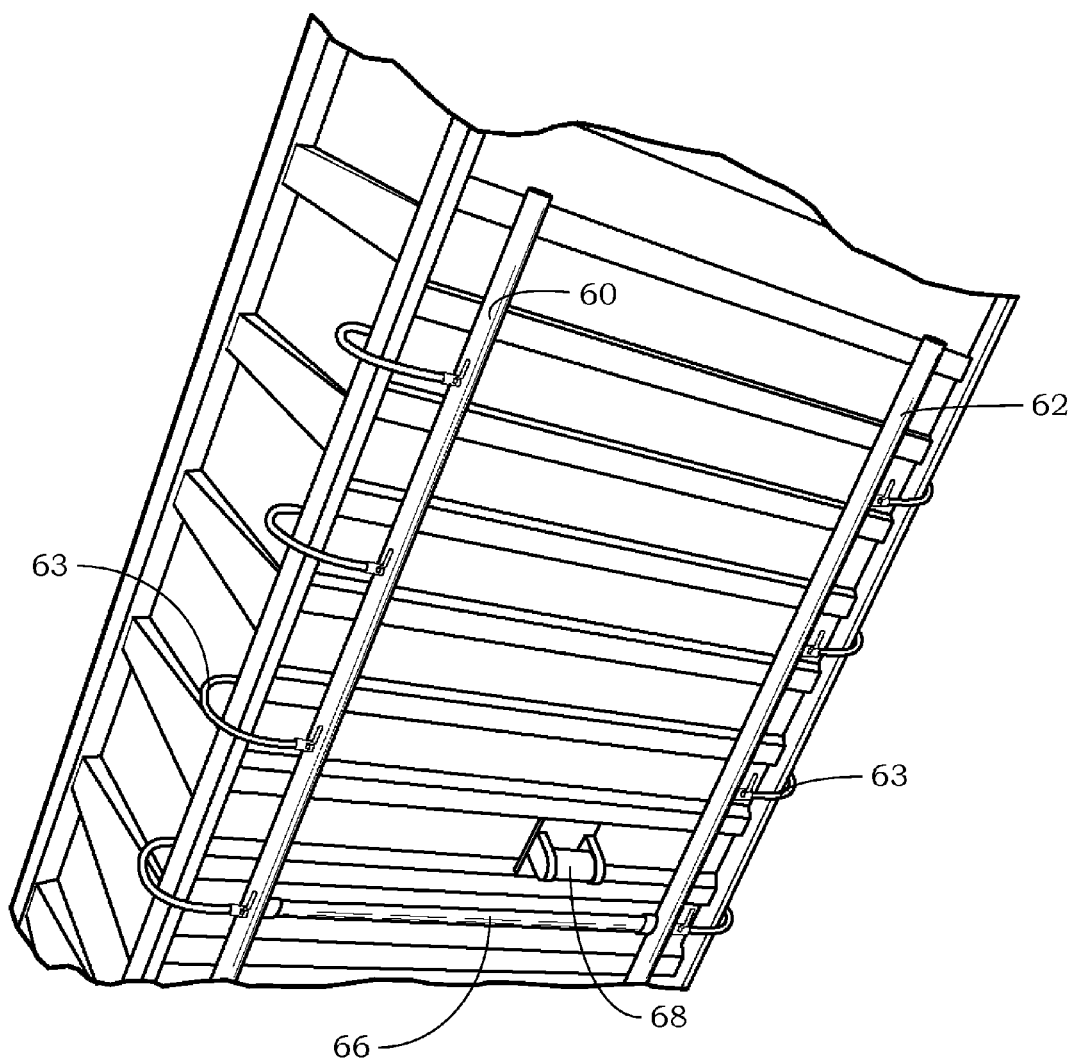
FIG. 4 is a bottom perspective view of the dump truck load bed.

Referring FIGS. 1-4, an unloading apparatus of the present invention is generally indicated by reference numeral 20. Unloading apparatus 20 is coupled to an outlet 22 attached to a box trailer or bed 24 of a dump truck 26. The dump truck 26 is a conventional dump truck for hauling dry bulk material with a box trailer 24 with a cover (not shown) to prevent the dry material from getting wet and blowing out of the back of the trailer. The box trailer 24 includes a conventional hydraulic lift to raise the front of the trailer and dump the load from the back of the trailer. The outlet 22 is attached to the rear panel 28 of the bed 24. The outlet 22 includes a butterfly valve 30 to control discharge of the dry material 27 from the bed 24 into a receiver 32 of the unloading auger 20. The box bed 24 is hinged at the rear of the truck 26 and hydraulically operated to lift the front of the bed 24 to allow the contents thereof to be discharged the outlet 22 into the receiver 32.

The receiver 32 includes a flange 21 to couple the unloading auger 20 to the outlet 22. A motor 40 is mounted on one end of the unloading auger 20 and coupled to a pulley 42 by a belt 44. The pulley 42 is coupled to a first end 46 of an auger 48 mounted in a housing 50. The housing 50 includes a channel 52 to convey the dry material from the receiver 32 to a second end 54 of the auger 48 to a discharge 56. An air hose 58 is connected to the discharge 56 to help force the dry material through the discharge 56 and a discharge pipe (not shown) connected to the discharge 56 to convey the dry material to a silo or other storage container (not shown). Motor 40 may be an electric, hydraulic or pneumatic motor.

The trailer 26 is covered by a tarp (not shown) across its top from front to rear so that dry material 27 loaded therein is kept dry and maintained entirely within the trailer 26 during the unloading process. The trailer 26 includes air rails 60 and 62 extending longitudinally along each side of the trailer 26 for the purpose of injecting air under pressure into the interior of the trailer through air hoses 63 at nozzles 64 to aerate the dry material 27 on each side of the trailer 26 and the rear thereof where the trailer is connected via outlet 22 to the receiver 32. The air rails 60 and 62 are connected by a cross tube 66 extending under the bed 24 of the trailer 26. Although the rails 60 and 62 are shown extending along approximately the rear half of the length of the trailer 26, it may be appreciated that they may extend further forward with additional nozzles if desired to assure complete and rapid transfer of the dry material 27 from the truck bed 24 to the receiver 32.

A vibration unit 68 mounted to the bottom of the bed 24 assures that the dry material 27 is released from the bed floor 70 and sides 72 and 74 to completely empty the bed 24 of the trailer 26.

In operation, the unloading auger 20 is coupled to the outlet 22 of the trailer bed 24 to unload the dry material 27. The butterfly valve 30 is opened by rotating arm 31 and the motor 40 powered on to rotate the pulley 42 and auger 48. The trailer 24 is slowly raised to discharge the dry material 27 through the outlet 22 into the receiver 32. As the auger 48 is rotated by the motor 40 driving the pulley 42, the dry material 27 is transferred from the receiver 32 through the channel 52 of the housing 50 to the discharge 56. Compressed air from the inlet 58 helps move the dry material 27 through the discharge pipe to the silo or other storage container. Compressed air also travels through the air rails 60 and 62, and air hoses 63, to the nozzles 64 to blow the dry material powder 27 away from the sides 72 and 74 of the trailer 24. Additionally, the vibration unit 68 keeps the dry material power 27 moving along the bottom 70 of the trailer 24 for complete unloading of the dry material 27. Once the dry material is emptied from the trailer 24, a different dry material may be loaded for the back haul.

It is to be understood that while certain forms of this invention have been illustrated and described, it is not limited thereto except insofar as such limitations are included in the following claims.

Having thus described the invention, what is claimed as new and desired to be secured by Letters Patent is:

1. An apparatus for rapidly unloading a dry bulk material from a dump truck having a box trailer with a bed and sides, a hydraulic lift for raising and lowering a front end of the box trailer, and a rear panel, said apparatus comprising:
    an outlet having a generally pyramidal frustum shape with a base coupled to the box trailer below the rear panel and a truncated top opposite said base and projecting away from the box trailer,
    a valve having open and closed positions and coupled to said outlet to selectively control discharge of the dry bulk material from the dump truck, and
    an unloading auger having a receiver coupled to said truncated top of said outlet, a housing coupled to said receiver, a channel within said housing for receiving an auger, a motor for driving said auger, and a discharge,
    wherein dry bulk material is discharged from the box trailer and funneled through said outlet when the front end of the box trailer is raised by the hydraulic lift and said valve is in said open position, and
    wherein the dry bulk material is received by said unloading auger receiver and transferred through said housing channel to said discharge by said auger rotated by said motor.

2. The apparatus of claim 1 further comprising air rails coupled to air nozzles extending through opposite sides of said outlet to aerate the dry bulk material and blow the bulk dry material away from the sides of said outlet.

3. The apparatus of claim 1 further comprising a vibration unit coupled to the bed of the box trailer to aid in transfer of the bulk dry material from the box trailer to said outlet.

4. The apparatus of claim 1 further comprising an air line coupled to said discharge to force the bulk dry material through said discharge.

5. The apparatus of claim 1 wherein said motor is an electric motor.

6. The apparatus of claim 1 wherein said motor is a hydraulic motor.

7. The apparatus of claim 1 wherein said motor is a pneumatic motor.

8. An apparatus for rapidly unloading a dry bulk material from a dump truck having a box trailer with a bed and sides, a hydraulic lift for raising and lowering a front end of the box trailer, and a rear panel, said apparatus comprising:
    an outlet having a generally pyramidal frustum shape with a base coupled to the box trailer below the rear panel and a truncated top opposite said base and projecting away from the box trailer,
    a valve having open and closed positions and coupled to said outlet to selectively control discharge of the dry bulk material from the dump truck,
    an unloading auger having a receiver coupled to said outlet, a housing coupled to said receiver, a channel within said housing for receiving an auger, a motor for driving said auger, and a discharge,
    air rails coupled to air nozzles extending through opposite sides of said outlet and the box trailer, and
    a vibration unit coupled to the bed of the box trailer,
    wherein dry bulk material is discharged from the box trailer through said outlet when the front end of the box trailer is raised by the hydraulic lift and said valve is in said open position,
    wherein compressed air from said air nozzles aerate the dry bulk material and blow the bulk dry material away from the sides of said outlet and the box trailer,
    wherein vibrations from said vibration aid in transfer of the bulk dry material from the box trailer through said outlet, and
    wherein the dry bulk material is received by said unloading auger receiver and transferred through said housing channel to said discharge by said auger rotated by said motor.

9. The apparatus of claim 8 further comprising an air line coupled to said discharge to force the bulk dry material through said discharge.

10. The apparatus of claim 8 wherein said motor is an electric motor.

11. The apparatus of claim 8 wherein said motor is a hydraulic motor.

12. The apparatus of claim 8 wherein said motor is a pneumatic motor.

13. An apparatus for rapidly unloading a dry bulk material from a dump truck having a box trailer with a bed and sides, and a hydraulic lift for raising and lowering a front end of the box trailer, said apparatus comprising:

an outlet having a generally pyramidal frustum shape with a base coupled to the box trailer below the rear panel and a truncated top opposite said base and projecting away from the box trailer, a valve having open and closed positions and coupled to said outlet to selectively control discharge of the dry bulk material from the dump truck through said outlet, an unloading auger having a receiver, a housing coupled to said receiver, a channel within said housing for receiving an auger, a motor for driving said auger, and a discharge, said receiver having a flange adapted to couple said unloading auger to said outlet, air rails coupled to air nozzles extending through opposite sides of said outlet and the box trailer, a vibration unit coupled to the bed of the box trailer, and an air line coupled to said discharge, wherein dry bulk material is discharged from the box trailer through said outlet when the front end of the box trailer is raised by the hydraulic lift and said valve is in said open position, wherein compressed air from said air nozzles aerate the dry bulk material and blow the bulk dry material away from the sides of the box trailer and said rear panel, wherein vibrations from said vibration aid in transfer of the bulk dry material from the box trailer through said outlet, wherein the dry bulk material is received by said unloading auger receiver and transferred through said housing channel to said discharge by said auger rotated by said motor, and wherein compressed air from said air line coupled to said discharge forces the bulk dry material through said discharge.

14. The apparatus of claim 13 wherein said motor is an electric motor.

15. The apparatus of claim 13 wherein said motor is a hydraulic motor.

16. The apparatus of claim 13 wherein said motor is a pneumatic motor.

* * * * *